US007577752B2

(12) United States Patent
Kimura

(10) Patent No.: US 7,577,752 B2
(45) Date of Patent: Aug. 18, 2009

(54) RELIABLE PAGE FLOW CONTROL

(75) Inventor: Jin Kimura, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 509 days.

(21) Appl. No.: 11/320,094

(22) Filed: Dec. 28, 2005

(65) Prior Publication Data

US 2007/0150591 A1    Jun. 28, 2007

(51) Int. Cl.
G06F 15/16    (2006.01)
(52) U.S. Cl. .................. 709/232; 709/200; 709/203
(58) Field of Classification Search ......... 709/200–203, 709/217–232, 236
See application file for complete search history.

(56) References Cited

U.S. PATENT DOCUMENTS

| 6,633,316 | B1 * | 10/2003 | Maddalozzo et al. ........ 715/854 |
| 7,089,563 | B2 * | 8/2006 | Nagel et al. ................. 719/313 |
| 7,152,106 | B2 * | 12/2006 | Cohen et al. ................ 709/224 |
| 7,328,238 | B2 * | 2/2008 | Forslund .................... 709/203 |
| 2002/0062359 | A1 * | 5/2002 | Klopp et al. ................ 709/219 |
| 2002/0138624 | A1 * | 9/2002 | Esenther .................... 709/227 |
| 2003/0182357 | A1 * | 9/2003 | Chess et al. ................ 709/203 |
| 2004/0205586 | A1 * | 10/2004 | Cohen et al. ................ 715/513 |
| 2005/0044506 | A1 * | 2/2005 | Makela ...................... 715/801 |
| 2005/0050438 | A1 * | 3/2005 | Cheung et al. .............. 715/500 |
| 2005/0132222 | A1 * | 6/2005 | Petrovic .................... 713/201 |
| 2005/0132267 | A1 * | 6/2005 | Aviv ......................... 715/500.1 |
| 2005/0188061 | A1 * | 8/2005 | Bloom ....................... 709/220 |
| 2005/0204292 | A1 * | 9/2005 | Kibilov et al. .............. 715/738 |
| 2006/0004927 | A1 * | 1/2006 | Rehman et al. ............. 709/250 |
| 2006/0085766 | A1 * | 4/2006 | Dominowska et al. ...... 715/854 |
| 2006/0095538 | A1 * | 5/2006 | Rehman et al. ............. 709/217 |
| 2006/0136492 | A1 * | 6/2006 | Lin .......................... 707/103 Y |
| 2006/0294240 | A1 * | 12/2006 | Sattler et al. ............... 709/227 |
| 2007/0288589 | A1 * | 12/2007 | Chen et al. ................. 709/217 |

FOREIGN PATENT DOCUMENTS

JP    2004029949    1/2004

* cited by examiner

Primary Examiner—Moustafa M Meky
(74) Attorney, Agent, or Firm—Lieberman & Brandsdorfer, LLC

(57) ABSTRACT

A method and system are provided for maintaining flow control in a multi-page process. Each page that is produced by a server is embedded with an identifier. Similarly, each event that is processed by a browser is embedded with an event identifier. Both of these identifiers are stored in a session history. When a page is processed out-of-order from the intended flow, the session history is consulted to determine if a recovery of the flow can be maintained, or if the browser must return to the beginning of the program.

19 Claims, 7 Drawing Sheets

US 7,577,752 B2

RELIABLE PAGE FLOW CONTROL

TECHNICAL FIELD

This invention relates to communication between a browser and a server. More specifically, the invention relates to controlling page flow between a browser and a server to ensure an intended page flow is followed.

DESCRIPTION OF THE PRIOR ART

The simple functions of a web browser are easily accepted and understood by a broad range of users and it has made an enormous contribution to the spread of the Internet. For this reason, applications that utilize a browser are not limited to in-house systems, and its use is expanding into other fields, such as Internet banking and online trading of equities.

As a general rule, a browser temporarily stores a previously displayed HTML page locally. This enables a user to browse a page previously displayed without accessing a server to request a re-submission of the previously displayed page. In one embodiment, it is possible to browse a previously viewed page by using the "Back" or "Refresh" buttons on the browser. However, there are some applications that include a series of browser pages within a workflow wherein the order of the pages must be controlled in order to process through the intended workflow. Such applications are widely used in electronic commerce. In these circumstances, after a user has displayed a transaction completion page, if they then display a past page by using the Back or Refresh button of the browser and make a transaction request again, the processing may be run twice and a mismatch of transaction data may occur. This problem is known in the art as flow control.

There are several known solutions for solving flow control between a web browser and a server communicating the pages to the browser. FIG. 1 is a flow chart (10) illustrating one prior art solution that introduces an identifier, also know as a token, to distinguish whether the request from a browser is made from a page displayed in the past, or made from the last page sent to the server. The identifier prevents double processing of a specific transaction. A server creates and embeds a token in a requested page (12), stores the token in an HTTP session (14), and sends the requested page to a browser (16). Following processing of the page and token, the browser sends an HTTP request, with the token attached, to the server (18). The server compares the token received from the browser with the token stored for the current session (20), and conducts a test to determine if the token sent by the browser matches the token stored (22). If the response to the test at step (22) is positive, the server processes the browser's request (26). Similarly, if the response to the test at step (22) is negative, the server denies the browser's request and issues a flow error message (24). Accordingly, the mechanism in FIG. 1 issues an identifier, known as a token, to control communication and processing between a browser and server for an identified session.

In one embodiment, the flow diagram of FIG. 1 may be modified such that when the browser receives a "Back" or "Refresh" instruction, the token of the then displayed page is rewritten with the token of the last page sent from the server, which is the proper page for the workflow, and the page flow continues uninterrupted. When a request is then sent from the browser to the server, the token received and the token stored correspond, since the token has been rewritten with the token from the proper page within the workflow. Therefore, the processing of page data mistakenly occurs more than once.

As shown, there are several limitations with implementation of a token with a page request from a server. Such limitations include, but are not limited to, rewriting of the token, processing after an error, and processing multiple pages simultaneously or near simultaneously in multiple frames. FIG. 2 is a flow chart (50) demonstrating one of the limitations in a case of opening multiple frames in a web browser. As in FIG. 1, a server creates and embeds a first token, $Token_1$, in a first page requested, $Page_1$ (52). The server stores the token, $Token_1$, in an HTTP session and sends $Page_1$, to the browser (54). Upon receipt of the page, the browser displays the page requested, $Page_1$, in a first frame, $Frame_1$, (56). Sometime following the request of the first page, $Page_1$, the server receives a request for a second page, $Page_2$, intended to be opened in a second frame on the browser. The server creates and embeds a token, $Token_2$, in the page requested, $Page_2$ (58). The server stores the token in the HTTP session and sends $Page_2$ to the browser (60). The browser displays the page requested, $Page_2$, in the second frame, $Frame_2$ (62). Following creation of both frames, $Frame_1$, and $Frame_2$, and display of the requested pages thereon, the browser sends an HTTP request with $Token_1$, to the server (64). Upon receipt of the request, the server compares the received request from $Frame_1$, with embedded token, $Token_1$, to the last stored token, $Token_2$ (66), and conducts a test to determine if the received token matches the stored token (68). If the response to the test at step (68) is positive, the server processes the browser's request (70). Similarly, if the response to the test at step (68) is negative, the server denies the browser's request and issues a flow error message (72). The mechanism in FIG. 2 issues an identifier, known as a token, to each page created in a browser and server for an identified session. Accordingly, the information retained in memory by the server cannot distinguish between multiple frames processing different pages in a single session.

As shown in FIGS. 1 and 2, there are several limitations present in the prior art for addressing flow control. For example, the server only retains a record of the most recent token created. The creation of the token is a first step to mitigating flow control error, however, it does not remove the potential for a flow control error. Accordingly, there is a need for a solution that prevents processing of commands in a flow not intended or authorized by the designated page flow.

SUMMARY OF THE INVENTION

This invention comprises a method and system for maintaining flow control in a work flow.

In one aspect of the invention, a method is provided for managing flow control. A request identifier is issued and embedded with a requested page, and a business process identifier is issued and associated with the request identifier. The request identifier is stored with the business process identifier in memory. Processing of a requested page is restricted to the stored request identifier with the business process identifier matching the request and business process identifier with the requested page.

In another aspect of the invention, a computer system is provided with a browser adapted to receive a page requested from a server, and the server adapted to generate the page responsive to a request from the browser. A request identifier is issued by the server and embedded with the requested page, and a business process identifier is generated by the server and associated with the request identifier. Memory is provided to store the server generated request identifier and the business process identifier. A manager is provided to compare the request identifier and the business process identifier with the requested page and to restrict processing of the requested page to a match of identifiers of the requested page with the stored identifiers.

In yet another aspect of the invention, an article is provided with a computer readable medium. Means in the medium having computer readable code are provided. The computer readable code includes instructions for issuing a request identifier and embedding the request identifier with a requested page, and instructions for issuing a business process identifier and associating the identifier with the request identifier. Instructions are also provided for storing the request identifier with the business process identifier in memory. In addition, instructions are provided for restricting processing of a requested page to the stored request identifier with the business process identifier matching the request and business process identifier with the requested page.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A flow control mechanism is employed that forces a user to follow the flow of a program with multiple pages as intended by a page flow designer. The solution includes employing one or more identifiers to either prevent an unauthorized call and/or to recover from the unauthorized call without restarting the program. A page request identifier in conjunction with an associated business call identifier are stored in memory accessible by a server. Together the page request identifier and the business call identifier identify a page issued by a server to a browser. In response to an error flow message issued by a server due to a mismatch between the request identifier and the business call identifier, the browser may issue a recovery request to prevent a restart of the program. If the request identifier and/or business process identifier are available in the session history information in memory, the server may issue a new request identifier associated with the business process identifier and return the requested page to the browser. Similar logic is employed to support issuance of multiple pages to multiple frames of a browser, respectively.

Technical Details

Figure 1:
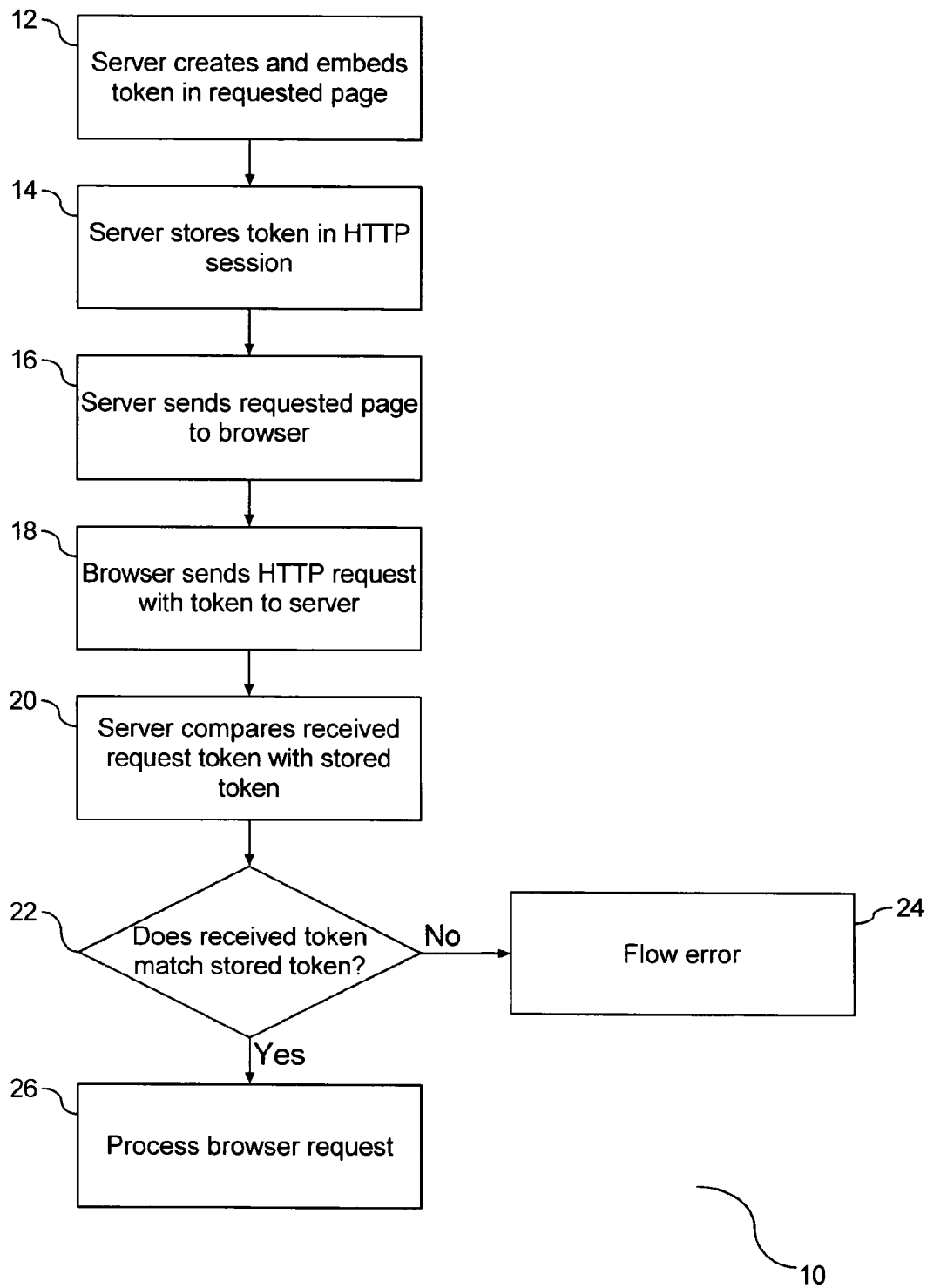
FIG. 1 is a flow chart illustrating a general prior art method for maintaining flow control.
Figure 2:
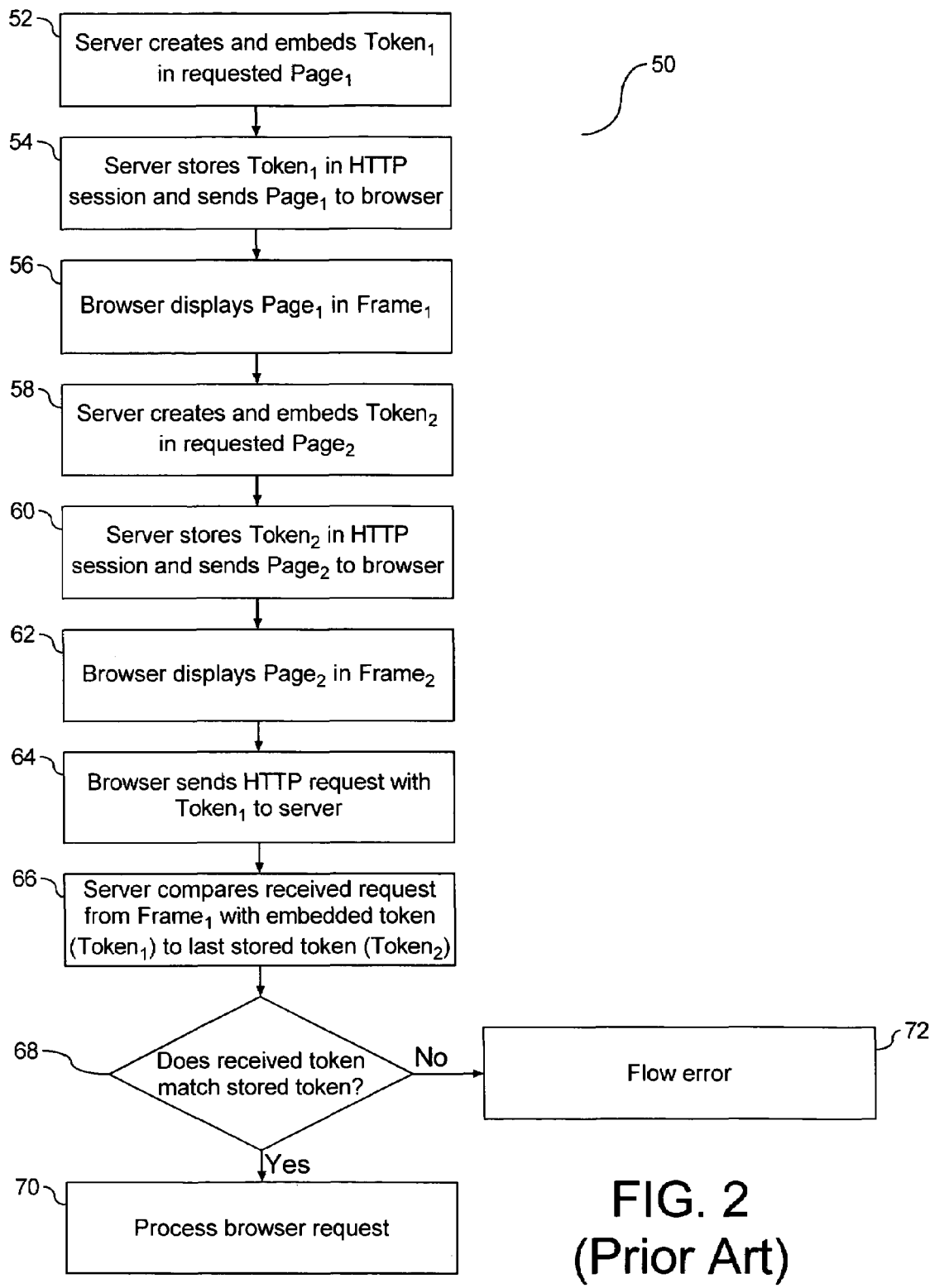
FIG. 2 is a flow chart illustrating a prior art method for maintaining flow control with a server supporting multiple active frames in a browser.
Figure 3:
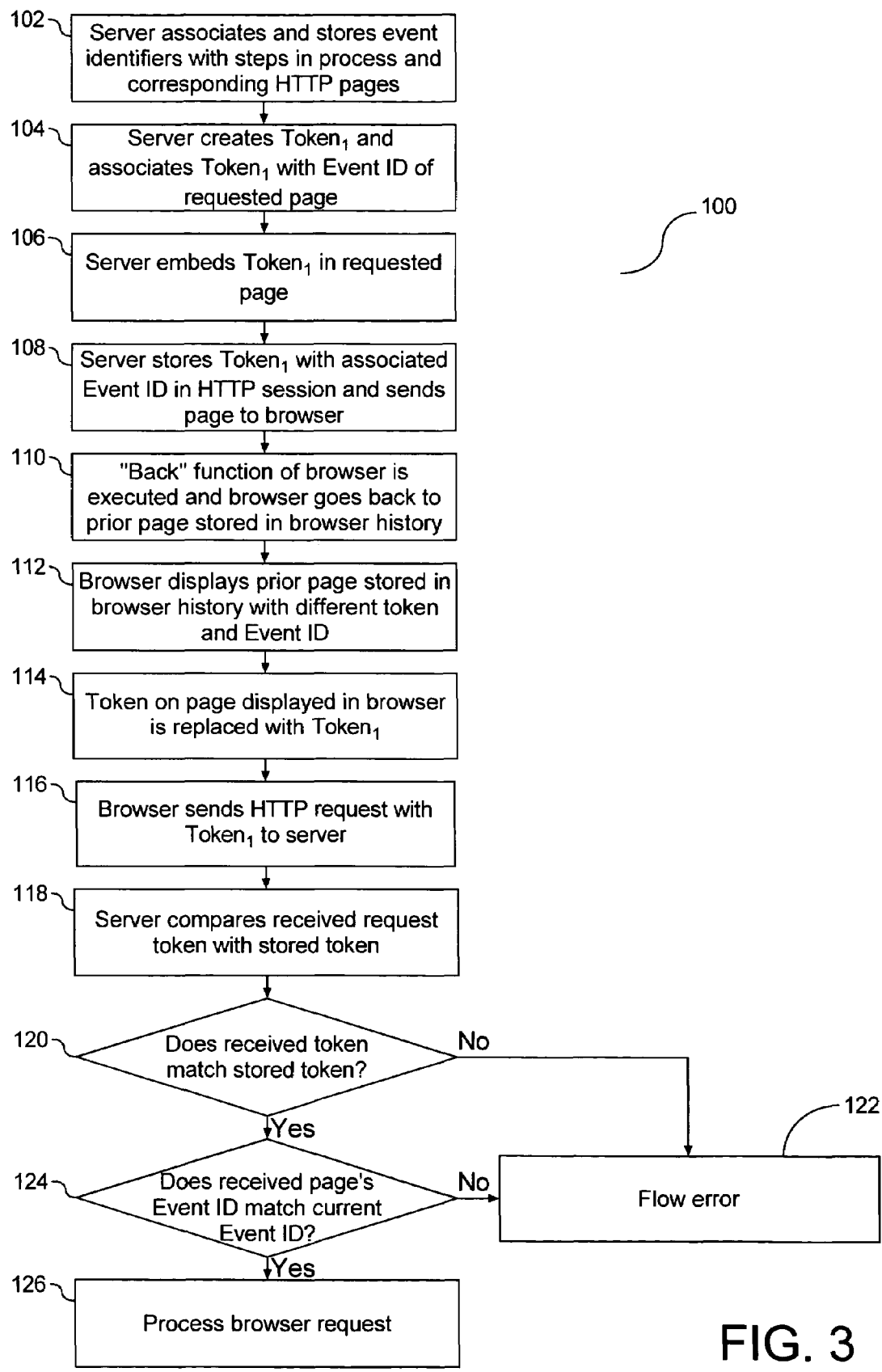
FIG. 3 is a flow chart illustrating a method for maintaining flow control by utilizing a business process call identifier in conjunction with a request identifier according to the preferred embodiment of this invention, and is suggested for printing on the first page of the issued patent.

FIG. 3 is a flow chart (100) illustrating a flow control mechanism that employs an irreplaceable unique character string mechanism in conjunction with a token. In one embodiment, the token is an identifier hidden in a HTML page and the unique character string is an event identifier, also known as a business process identifier. Any application must send the character string to the server to identify a event. The character string is identified as an event and it is associated with the token created and stored by the server. The server associates and stores event identifiers with steps in a process and corresponding HTTP pages (102). The server creates a first token, $Token_1$, and associates the token with a character string, $Event_1$, of a requested page (102). The server embeds $Token_1$, in the requested page (106), and stores $Token_1$, with associated $Event_1$, in the HTTP session and sends the page to the requesting browser (108). In one embodiment, the association between the token and the event is carried out in JSP (JavaServer Pages). At some time during the current browser session and following processing of the page request at steps (102)-(108), the browser receives a request for a prior page, which would have a different token associated with a different event character string. The prior page is not within the process flow control intended by the page flow designer. The "Back" function of the browser is executed and the browser goes back to the prior page stored in the browser history (110). The browser displays the prior page stored in the browser history with a different token and different event identifier (112). Processing of a prior page by the browser includes replacing the token on the page displayed in the browser with $Token_1$, (114). However, the event identifier is not replaced. While in the prior page, the browser sends an HTTP request to the server with the $Token_1$, (116). The server compares the received request token with the stored token (118). A test is conducted to determine if the received token matches the stored token (120). A negative response to the test at step (120) will result in the server denying the browser's request and issuing a flow error message (122). However, a positive response to the test at step (120), will result in a subsequent test to determine if the received page's event identifier matches the current event identifier (124). A negative response to the test at step (124) will result in the server denying the browser's request and issuing a flow error message (122). However, a positive response to the test at step (124) will result in the server processing the browser's request (126). When judging the flow, the server compares the token received from the browser with the token stored in conjunction with a comparison of whether the event received is associated with the token received. Accordingly, the process outlined in FIG. 3 solves the problem associated with rerunning of an application by replacement of the token.

Figure 4A:
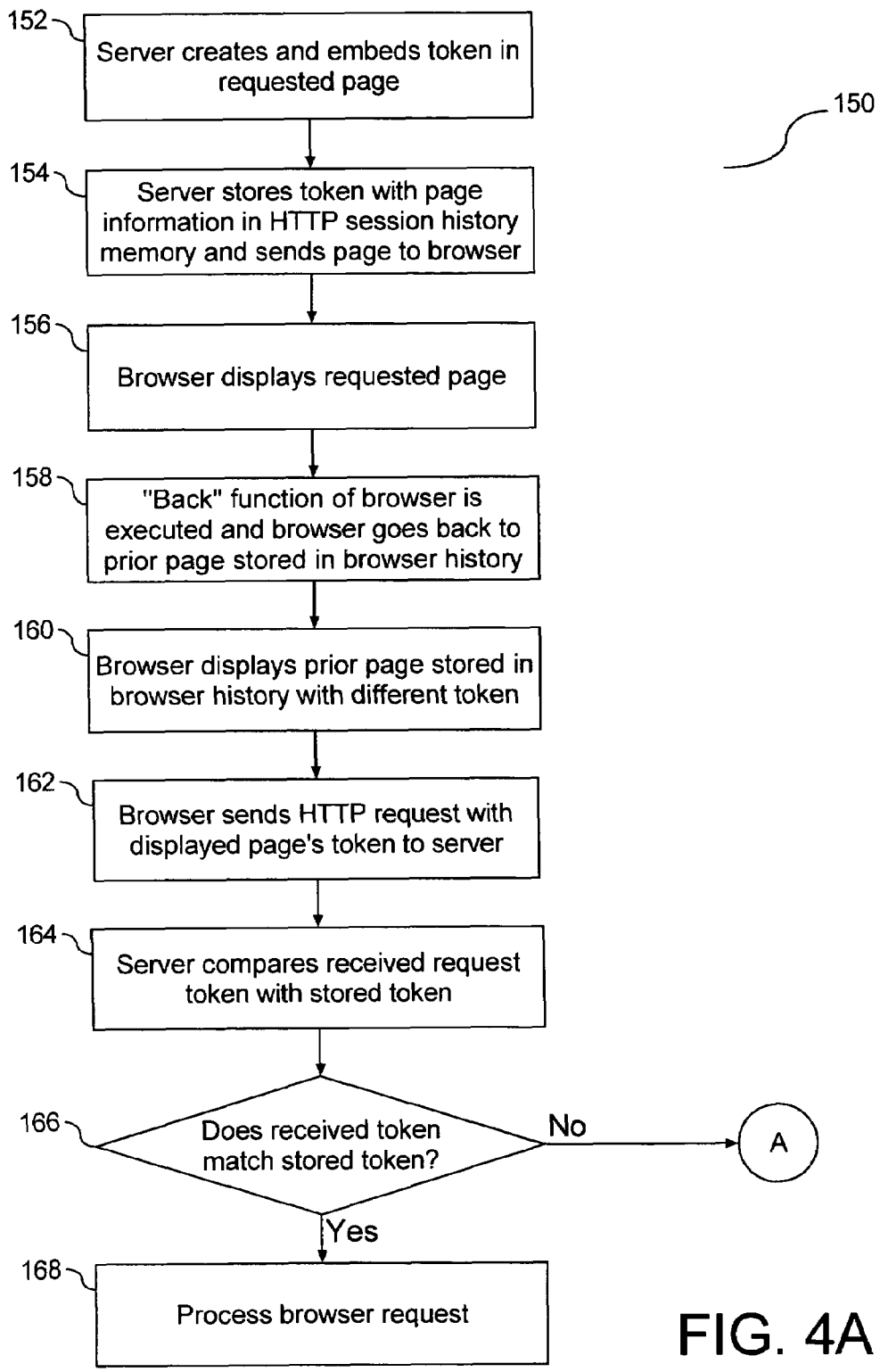
FIGS. 4A and 4B are flow charts illustrating a method for maintaining flow control in association with maintaining a session history record.
Figure 4B:
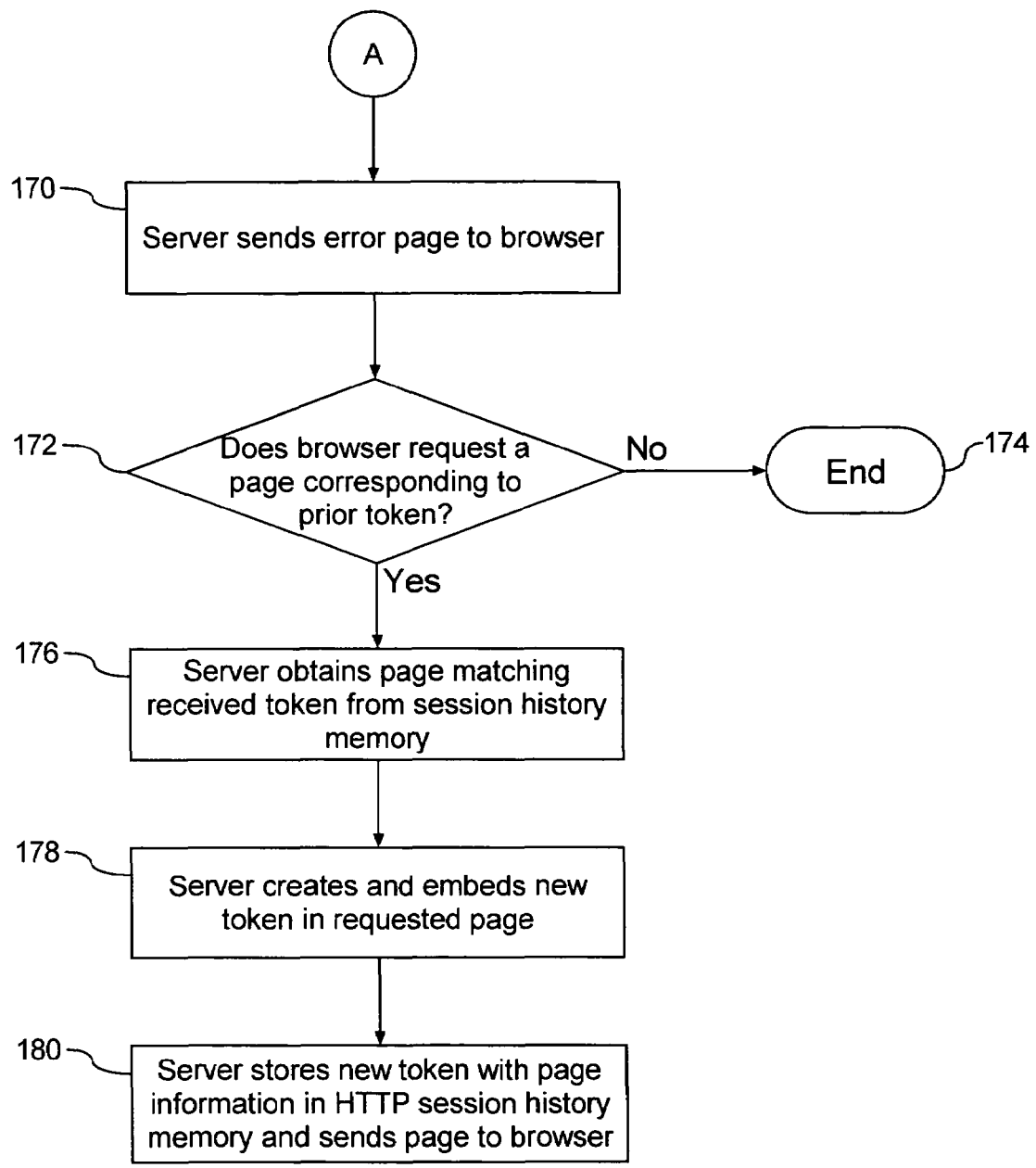

As discussed above, there are situations where a browser will receive an error flow message from a server in response to a page request that does not following the intended flow control of a program. The browser must restart the program to enable accurate processing of the request. In one embodiment, the server may enable the browser to continue processing from a flow control error by maintaining a session history associated with the browser in memory. The session history includes storage of an individual token with page information in memory. FIGS. 4A and 4B are a flow chart (150) illustrating a first part of implementation of the session history. Upon receipt of a request for a page from a browser, the server creates and embeds a first token, $Token_1$, in the requested page, $Page_1$, (152). The server stores the token, $Token_1$, together with page information in a HTTP session history memory and sends the page, $Page_1$, to the browser (154). In one embodiment, the page information is the name of the page. Upon receipt of the requested page, $Page_1$, the browser displays the requested page (156). Following the display at step (156), the "Back" function of the browser is executed and the browser goes back to a prior page stored in the browser history (158). The browser displays the prior page stored in the browser history with a different token (160). Thereafter, the browser sends a HTTP request with the token of the displayed page to the server (162). The server compares the received token with the stored token, $Token_1$, (162) to determine if the tokens match (166). If the tokens are the same, the server processes the browser request (168). However, if the tokens are not the same, the server issues a flow error page to the browser (170). Thereafter, a test is conducted to determine if the browser has requested a page corresponding to a prior token (172). A negative response to the test at step (172) will result in completion of the processing (174). However, a positive response to the test at step (172) will result in the server obtaining a page matching that of the received token from the session history stored in memory (176). The process in step (176) is known as a recovery processing. The server creates and embeds a new token, $Token_2$, in the requested page (178), stores the new token, $Token_2$, with page information in the HTTP session history memory, and sends the page to the browser (180). Accordingly, since the tokens are chronologically listed together with the page request information, functions associated with the "Back" or "Refresh" buttons of a browser can be provided.

Figure 5:
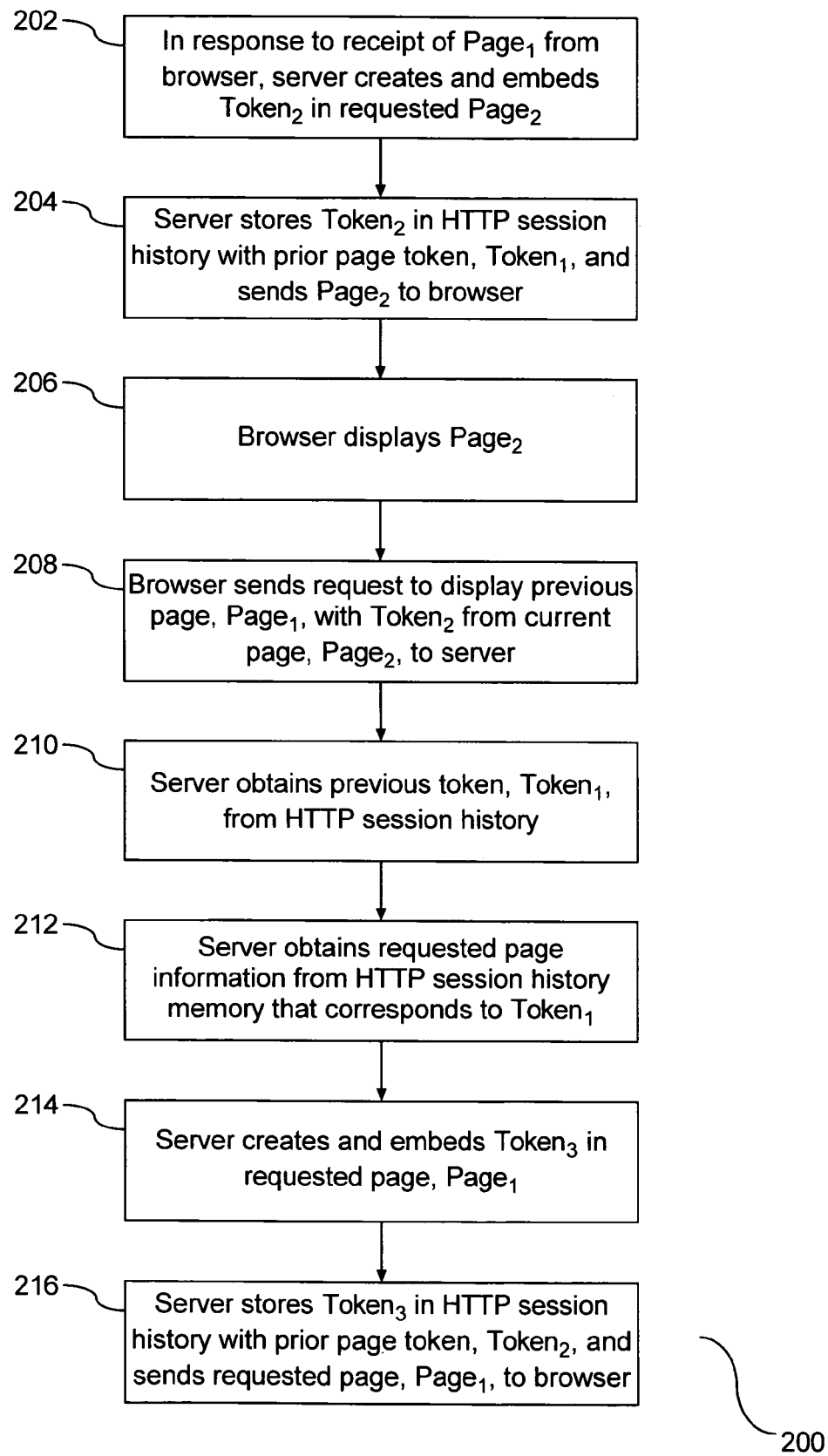
FIG. 5 is a flow chart illustrating a method for maintaining flow control through maintaining session history in conjunction with storage of prior token information.

In one embodiment, the session history may store a token for each page requested together with fields for a page information and identification of a previous token issued, if any. FIG. 5 is a flow chart (200) illustrating implementation of the session history in conjunction with storage of prior token information. Upon receipt of a request for a page, $Page_1$, from a browser, the server creates and embeds a token, $Token_2$, in a second requested page, $Page_2$ (202). The server stores the token, $Token_2$, in the HTTP session history together with page token, $Token_1$, and sends $Page_2$ to the browser (204). In one embodiment, the tokens are listed by request order. Upon receipt of the requested page, the browser displays $Page_2$ (206). Following the display at step (206), the browser sends a request to display previous page, $Page_1$, with $Token_2$ from current $Page_2$ to the server (208). The server obtains the previous token, $Token_1$, associated with $Page_1$, from the session history (210). In addition, the server obtains the requested page information from the session history memory that corresponds to $Token_1$, (212). The server creates and embeds $Token_3$, in the requested page, $Page_1$, (214) to satisfy the request received at step (208). In addition, the server stores $Token_3$ in the session history with Page , information and prior page token, $Token_2$, and sends requested page, $Page_1$, to the browser (216). Accordingly, the session history includes a list of tokens that identify both the current page and a prior token to ensure that processing of a prior page may continue based upon a received token while mitigating issuance of error flow messages.

Figure 6:
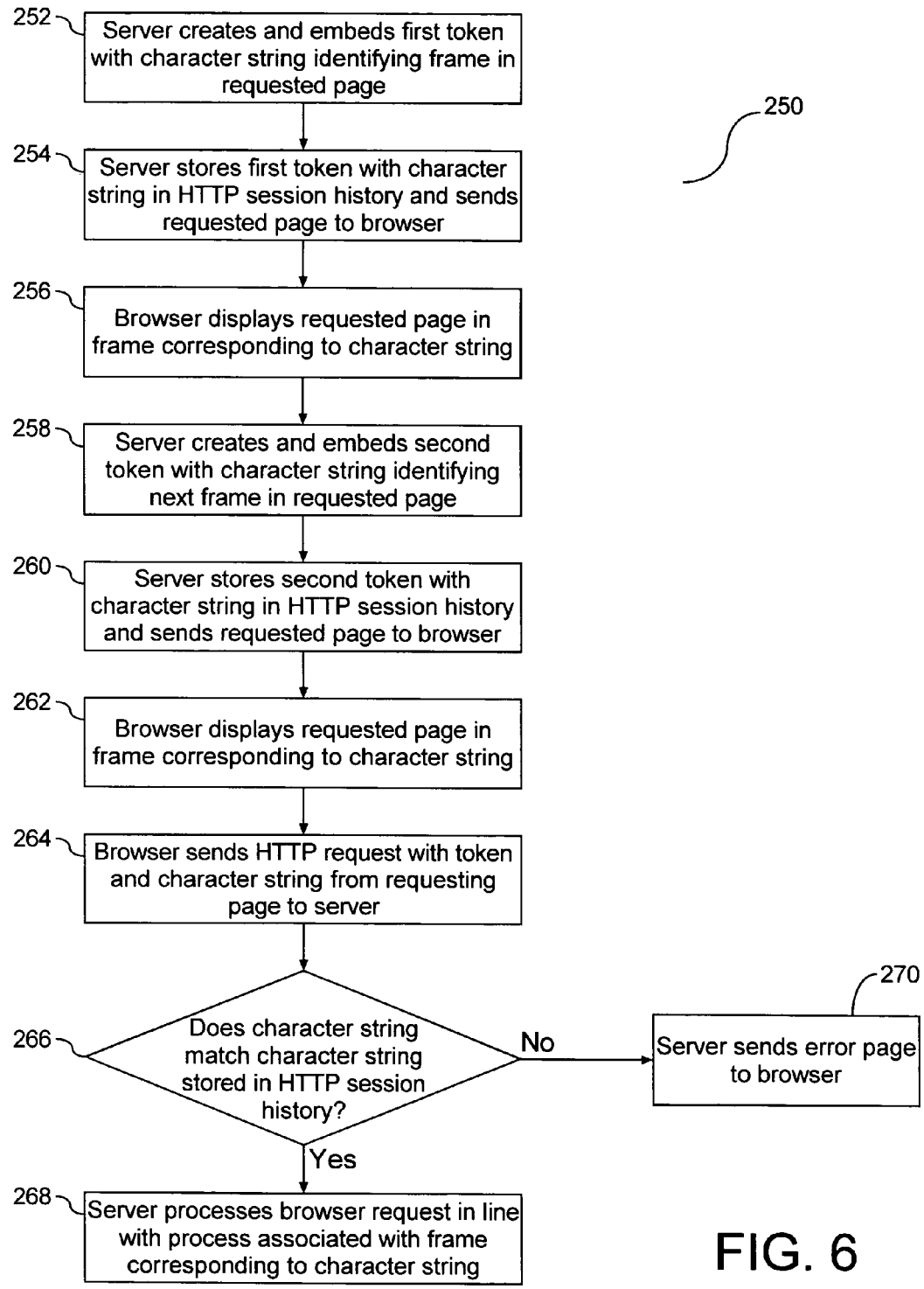
FIG. 6 is a flow chart illustrating a method for maintaining flow control in a multi-frame environment.

As shown in the prior art, error flow message are commonly associated with a browser that support multiple frames, and processing of different pages in different frames. FIG. 6 is a flow chart (250) extending the theme of maintenance of session history data as shown in FIGS. 4A, 4B, and 5 to an embodiment with multiple frames. Upon receipt of a request for a first page from a browser for a specified frame, the server creates and embeds a first token, $Token_1$, with a character string, $String_1$, identifying the frame in the requested page (252). The server stores the first token, $Token_1$, together with character string, $String_1$, in an HTTP session history stored in memory, and sends the requested page, $Page_1$, to the browser (254). The browser displays the requested page in the frame corresponding to the character string, $String_1$, (256). Upon receipt of a request for a second page from a browser for a specified frame, the server creates and embeds a second token, $Token_2$, with a character string, $String_2$, identifying the frame for the requested second page in the requested page (258). The server stores the second token, $Token_2$, together with character string, $String_2$, in a session history stored in memory and sends the requested second page to the browser (260). The browser displays the requested page in the frame corresponding to the character string, $String_2$ (262). Each token is associated with a frame in the browser. In one embodiment, there may be more than two frames, with each frame including a unique identifying character string. Following creation of the tokens, $Token_1$, and $Token_2$, and processing the display requests by the browser, the browser sends an HTTP a request with a token and character string from a requesting page to the server (264). Upon receipt, the server conducts a test to determine if the character string sent from the browser matches a character string stored in the HTTP session history (266). A positive response to the test at step (266), results in the server processing the browser request in line with a process associated with a frame corresponding to a character string (268). In one embodiment, the server issues and embeds a new token, $Token_3$ and associates the new token with a character string identifying the frame for the requested page. The server stores the token, $Token_3$, together with the character string in a session history stored in memory, and sends the requested page to the browser. However, a negative response to the test at step (266) will result in issuance of an error to the browser. Accordingly, maintenance of session history information to include token and frame data mitigates issuance of flow errors in a multi-frame browser with each frame displaying different pages.

In a preferred embodiment, the invention is implemented in software, which includes, but is not limited to, firmware, resident software, microcode, etc. With respect to software elements, a manager is provided that resides within memory. The manager may include instructions and/or program code for invoking the algorithms outlined and discussed above. Similarly, in a hardware environment, the managers may reside external to memory.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having program code encoded therein. Such program storage means can be any available media which can be accessed by a general purpose or special purpose computer. By way of example, but not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, wireless and Ethernet adapters are just a few of the currently available types of network adapters.

Advantages Over The Prior Art

Incorporating a session history management of tokens issued in conjunction with business process identifiers ensures reliable flow control. A centralized location is maintained for storage of the session history. This prevents rewriting of an issued token and forces a browser to follow the flow intended by the page flow designer to support workflow consistency over several pages.

Alternative Embodiments

It will be appreciated that, although specific embodiments of the invention have been described herein for purposes of illustration, various modifications may be made without departing from the spirit and scope of the invention. In particular, the token can take the form of a character string, a numeric identifier, or combinations thereof. Similarly, the event and frame identifiers may take the form of a character string, a numeric identifier, or combinations thereof. Also, the entries in memory may be stored in a table in volatile or persistent memory to organize the identifiers and make them more readily accessible by the server. Accordingly, the scope of protection of this invention is limited only by the following claims and their equivalents.

I claim:

1. A method for managing flow control, comprising the steps of:
   issuing a request identifier and embedding the request identifier with a requested page;
   issuing a business process identifier and associating said identifier with said request identifier;
   storing said request identifier with said business process identifier in memory; and
   restricting processing of a requested page to said stored request identifier with said business process identifier matching said request and business process identifier of said requested page.

2. The method of claim 1, further comprising a browser sending a request for recovery of an error received in response to a mismatch between said requested page with an associated identifier and said stored request identifier with said business process identifier.

3. The method of claim 2, further comprising a server processing said recovery request responsive to availability of said request identifier stored with said business process identifier in memory and issuing a new request identifier to satisfy said requested page.

4. The method of claim 1, further comprising issuing a frame identifier responsive to said requested page and storing said frame identifier with said request identifier and said business processing identifier in memory.

5. The method of claim 4, further comprising processing a page request from a browser for a different frame responsive to said request identifier associated with said frame identifier being stored in memory.

6. The method of claim 5, further comprising said server issuing a new request identifier and associating said new request identifier with a prior request identifier, a prior business process identifier, and said frame identifier.

7. A computer system, comprising:
   a browser adapted to receive a page requested from a server;
   said server adapted to generate said page responsive to a request from said browser;
   a request identifier adapted to be issued by said server and embedded with said requested page;
   a business process identifier adapted to be generated by said server and associated with said request identifier;
   memory adapted to store said request identifier and said business process identifier; and
   a manager adapted to compare said request identifier and said business process identifier with said requested page and to restrict processing of said requested page to a match of identifiers of said requested page with said stored identifiers.

8. The system of claim 7, further comprising a request for recovery adapted to be sent by said browser responsive to a mismatch between said requested page and an associated identifier and said stored request identifier with said business process identifier.

9. The system of claim 8, wherein said manager is adapted to issue a new request identifier to satisfy said requested page in response to presence of said request identifier stored with said business process identifier in memory.

10. The system of claim 7, further comprising a frame identifier adapted to designate a frame within a browser, wherein said frame identifier is adapted to be stored with said request identifier and said business processing identifier in memory.

11. The system of claim 10, wherein said manager is adapted to process a page request from a browser for a different frame responsive to said request identifier associated with said frame identifier being stored in memory.

12. The system of claim 11, wherein said server is adapted to issue a new request identifier and associate said new request identifier with a prior request identifier, a prior business process identifier, and said frame identifier.

13. An article comprising:
   a computer-readable medium;
   means in the medium having computer readable code comprising:
      instructions for issuing a request identifier and embedding the request identifier with a requested page;

instructions for issuing a business process identifier and associating said identifier with said request identifier;

instructions for storing said request identifier with said business processing identifier in memory; and instructions for restricting processing of a requested page to said stored request identifier with said business process identifier matching said request and business process identifier of said requested page.

14. The article of claim 13, further comprising instructions for a browser sending a request for recovery of an error received in response to a mismatch between said requested page and an associated identifier and said stored request identifier with said business process identifier.

15. The article of claim 14, further comprising instructions for a server processing said recovery request responsive to availability of said request identifier stored with said business process identifier in memory and issuing a new request identifier to satisfy said requested page.

16. The article of claim 13, further comprising instructions for issuing a frame identifier responsive to said requested page and storing said frame identifier with said request identifier and said business processing identifier in memory.

17. The article of claim 16, further comprising instructions for processing a page request from a browser for a different frame responsive to said request identifier associated with said frame identifier being stored in memory.

18. The article of claim 17, further comprising instructions for said server issuing a new request identifier and associating said new request identifier with a prior request identifier, a prior business process identifier, and said frame identifier.

19. The article of claim 13, wherein the medium is a recordable data storage medium.

* * * * *